United States Patent
Ide

(12) 
(10) Patent No.: US 6,278,384 B1
(45) Date of Patent: Aug. 21, 2001

(54) KEYBOARD CONTROL METHOD AND KEYBOARD CONTROL APPARATUS

(75) Inventor: Toshinao Ide, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/144,361

(22) Filed: Aug. 31, 1998

(30) Foreign Application Priority Data

Sep. 1, 1997 (JP) .................................................. 9-235525

(51) Int. Cl.[7] ....................................................... G06F 3/03
(52) U.S. Cl. ................................ 341/26; 341/23; 341/22; 708/146
(58) Field of Search .................................. 341/23, 26, 29, 341/22; 400/477, 83; 708/145, 146; 707/534

(56) References Cited

U.S. PATENT DOCUMENTS

| | | | |
|---|---|---|---|
| 3,786,497 | * 1/1974 | Davis et al. | 341/26 |
| 4,694,280 | * 9/1987 | Rollhaus | 341/20 |
| 4,891,786 | * 1/1990 | Goldwasser | 707/534 |
| 4,937,778 | * 6/1990 | Wolf et al. | 708/146 |
| 5,287,526 | * 2/1994 | Wolf et al. | 708/146 |
| 5,493,654 | * 2/1996 | Gopher | 341/22 |
| 5,659,308 | * 8/1997 | Goff | 341/26 |
| 5,734,928 | * 3/1998 | Nakasuji | 395/887 |
| 5,761,689 | * 6/1998 | Rayson | 707/533 |

FOREIGN PATENT DOCUMENTS

| | | |
|---|---|---|
| 63 46868 | 9/1988 | (JP) . |
| 2-242414 | 9/1990 | (JP) . |
| 3-31920 | 2/1991 | (JP) . |
| 7-210287 | 8/1995 | (JP) . |

OTHER PUBLICATIONS

Japanese Office Action issued Dec. 14, 1999 in a related application with English translation of relevant portions.

* cited by examiner

*Primary Examiner*—Michael Horabik
*Assistant Examiner*—Albert K. Wong
(74) *Attorney, Agent, or Firm*—Ostrolenk, Faber, Gerb & Soffen, LLP

(57) ABSTRACT

A keyboard control apparatus for a keyboard having a multicode key, to which are assigned a plurality of codes for characters and symbols, and a control key which is to be pressed at approximately the same time as the multicode key, has a key pressing time delay detection means that detects the times of pressing the multicode key and the control key, a threshold setting means, into which is stored a threshold value with regard to the delay time, a comparison means which compares the threshold value to the delay time between the pressing of the multicode key and the control key, and a key code generation means which, in response to the results of this comparison, validate a prescribed code data of the multicode key in the case in which the delay time is smaller than the threshold value.

9 Claims, 3 Drawing Sheets

Fig. 3
(A)
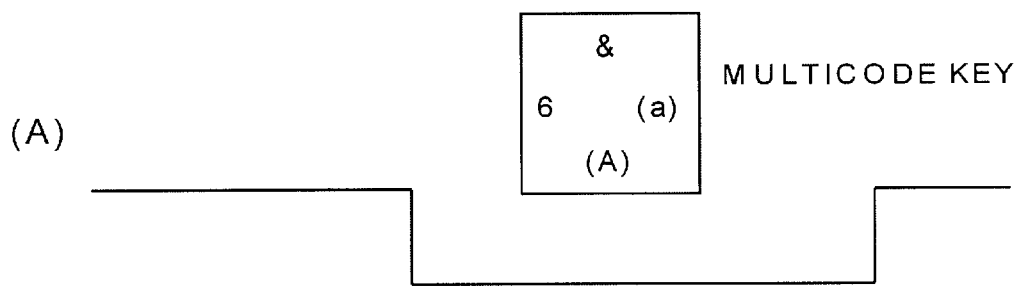
MULTICODE KEY
CONTROL KEY
OUTPUT : & KEY CODE
(B)
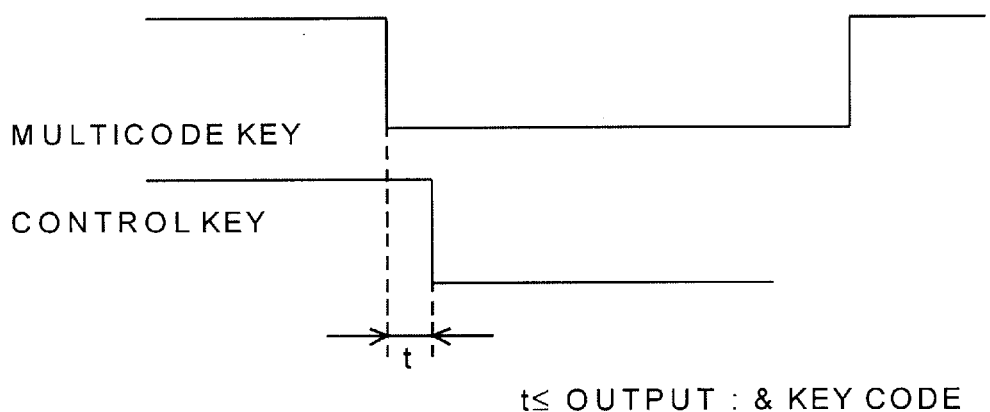
MULTICODE KEY
CONTROL KEY
t ≤ OUTPUT : & KEY CODE
(C)
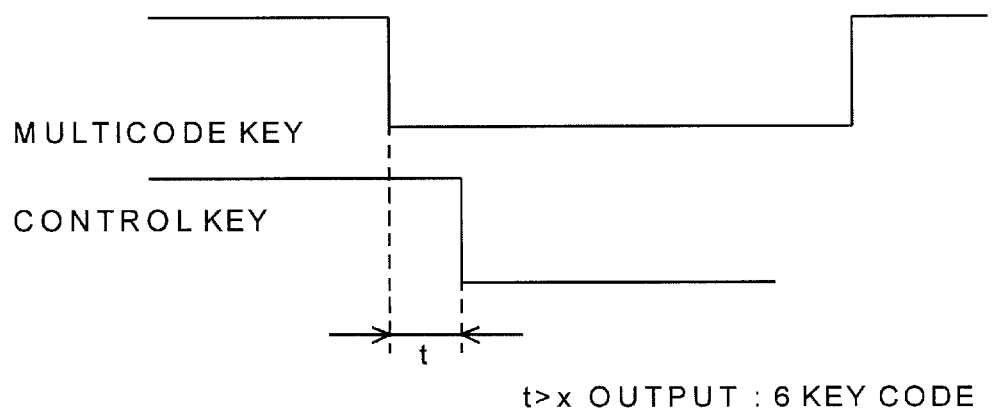
MULTICODE KEY
CONTROL KEY
t > x OUTPUT : 6 KEY CODE

KEYBOARD CONTROL METHOD AND KEYBOARD CONTROL APPARATUS

BACKGROUND OF THE INVENTION

1. Field of the Invention

The present invention relates to a keyboard control method for the purpose of controlling a keyboard which is an input device for an information processing apparatus such as a personal computer and to such a keyboard, and more specifically to a keyboard control method and keyboard control apparatus that are effective when performing high-speed input.

2. Description of Related Art

In keyboards in the past, the basic arrangement is that in which a key code is output, this corresponding to the usage of a single key. However, there are many cases in which a plurality of characters, symbols or the like are assigned to one and the same key for the purpose of outputting a plurality of key codes, in which case after one key, for example a control key, is stricken (pressed), the above-noted single key, to which a plurality of characters, symbols or the like is assigned, is pressed, thereby selectively outputting one of the pre-established key codes.

In controlling this type of keyboard in the past, in order to output one key code from a plurality of key codes assigned to a multicode key, it is necessary to press a control key (usually a shift key) either before or almost simultaneously with the pressing of the multicode key, so that if the control key is pressed after pressing the multicode key, because the pressing of the control key does not take effect, only the key code for the usual character or symbol of the multicode key is output, the desired and pre-established key code not being outputtable by this method.

In the Japanese Unexamined Patent Publication (KOKAI) No. 8-241155 there is language describing an input method whereby it is possible to reliably verify the input of a plurality of keys, even if they are pressed simultaneously.

In the Japanese Unexamined Patent Publication (KOKAI) Nos. 1-118917 and 7-239740, there is language describing a keyboard (key input apparatus) in which two keys are pressed simultaneously.

In both of these examples of prior art, a specific key code is obtained when a specific key is pressed first, following by the pressing of another key within a short period of time thereafter.

In the above-noted prior art input method, when performing high-speed input, it often occurs that a key that is to be pressed first is pressed simultaneously, or that a key to be pressed first is pressed after the other key, which was to be pressed after the first key. This type of input is incorrect, and requires correction.

Incorrect input and the correction input that it requires represents a loss of time to an operator performing high-speed input, and is devastating problem in terms of work efficiency.

In view of the above-noted drawbacks in the prior art, an object of the present invention is to provide a keyboard control method and a keyboard control apparatus which enables the input of a desired key code that is included in a multicode key, even if one key, such as a control key, which should in principle be pressed first, is pressed after another key, such as a multicode key.

SUMMARY OF THE INVENTION

To achieve the above-noted object, the present invention has the following basic technical constitution. Specifically, a first aspect of the present invention is a keyboard control method for a keyboard that is provided with a single multicode key to which are assigned a plurality of character or symbol codes and a control key for the purpose of selecting a pre-established prescribed code from the plurality of codes of the multicode key, whereby when this keyboard is operated, by pressing the control key either almost simultaneously with or immediately before the pressing of the multicode key, a prescribed code is selected from the plurality of codes that are assigned to the multicode key, and whereby even if the time of the pressing of the control key is delayed with respect to the time of the pressing of the multicode key control is performed so that the pre-established prescribed code of the multicode key is output.

A second aspect of the present invention is a keyboard control apparatus that has a keyboard which includes a single multicode key to which are assigned a plurality of character or symbol codes and a control key for the purpose of selecting a pre-established prescribed code from the plurality of codes of the multicode key when it is pressed either almost simultaneously with or immediately before the pressing of the multicode key, a key pressing time delay detection means for detecting the time of pressing the control key and the time of pressing the multicode key, a threshold value setting means which stores a threshold value with regard to the delay time, a comparison means for comparing the threshold value with the delay between the pressing time of the control key and the pressing time of the multicode key, and a key code generation means which, generates said key code in response to an output of the comparison means, by determining a pre-established prescribed code data of the multicode key being valid, if the delay time is smaller than the threshold value.

By virtue of the above-described configurations, in a keyboard control method and keyboard control apparatus according to the present invention, even if a key, such as a shift key or a control key, that should be pressed first is pressed after a key, such as a multicode key, that should be pressed afterward, if the shift or control key is pressed within a certain time period after the key that was to be pressed afterward is pressed, a judgment is made that the specific key code that is assigned to the multicode key and which was to be selected by the above-noted control key is still valid, this key code being output, so that in effect correction is made for the pressing time delay, within a specific range.

BRIEF DESCRIPTION OF THE DRAWINGS

FIG. 3 is a timing diagram which illustrates the principle of the present invention.

DETAILED DESCRIPTION OF THE PREFERRED EMBODIMENTS

Examples of a keyboard control method and keyboard control apparatus according to the present invention are described below in detail, with reference being made to the relevant accompanying drawings.

Figure 1:
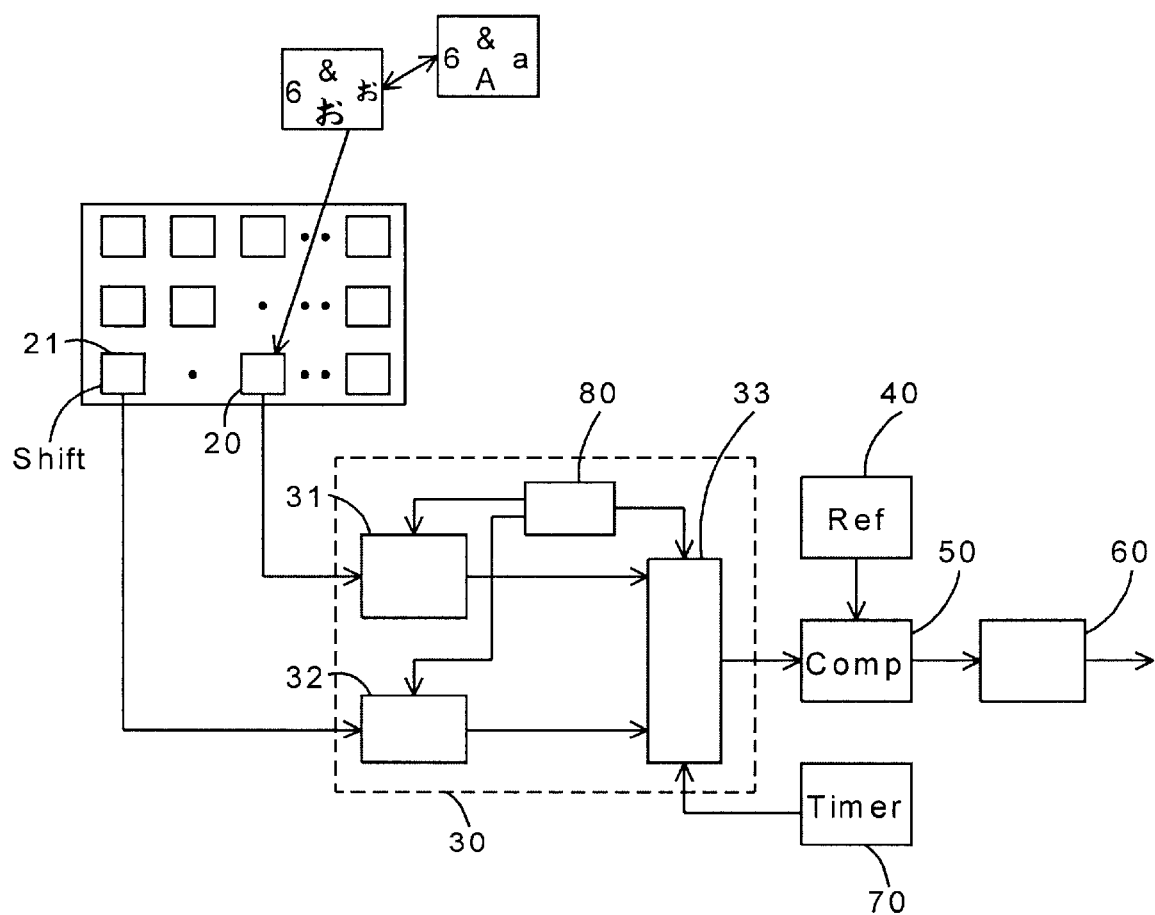
FIG. 1 is a block diagram which shows an embodiment of a keyboard control apparatus according to the present invention.

One example of a keyboard according to the present invention, as shown in block diagram form in FIG. 1, which shows a keyboard control apparatus 100 that has a keyboard 1 which includes a single multicode key 20 to which are assigned a plurality of character or symbol codes and a control key 21 for the purpose of selecting a pre-established prescribed code from the plurality of codes of the multicode key 20 when it is pressed almost simultaneously with (including the case of immediately before) the pressing of the multicode key 20, a key pressing time delay detection means 30 for detecting the time of pressing the control key 21 and the time of pressing the multicode key 20, a threshold value setting means 40 which stores a threshold value with regard to the delay time, a comparison means 50 for comparing the threshold value with the delay between the pressing time of the control key 21 and the pressing time of the multicode key 20, and a key code generation means 60 which, in response to a comparison result of the comparison means 50, validates a pre-established prescribed code data of the multicode key 20 if the delay time is smaller than the threshold value.

In this example of the present invention, the multicode key 20, as shown in FIG. 1, has assigned to it "6", "&", the Japanese hiragana character "あ", and the Japanese hiragana character "ぁ" (small character), these two Japanese characters being able to be replaced with English characters "A" and "a", respectively, and when the multicode key 20 is pressed simultaneously with the pressing of the control key 21, or immediately after the pressing of the control key 21, the key code for "&" is output, and when the control key is not pressed in combination with the multicode key 20, the normal "6" character key code is output.

In more detail with respect to the keyboard control apparatus 100 according to the present invention, the key pressing time delay detection means 30 is, for example, formed by a multicode key pressing time detection means 31 which detects the time of pressing of the multicode key 20, control key pressing time detection means 32 which detects the time of pressing of the control key 21, and a pressing time difference calculation means 33 which calculates the difference, t, between the key pressing times that are output from these two key pressing time detection means 31 and 32.

In the present invention, there is no particular restriction imposed with regard to the method that the pressing time difference calculation means 33 uses to calculate the key pressing time difference t in the present invention, and it is possible to directly calculate the delay in pressing the control key 21 with respect to the pressing of the multicode key 20 from the key pressing times that are output from the multicode key pressing time detection means 21 and the control key pressing time detection means 32, and it is also possible to provide an appropriate timer means 70, this timer means being started when the multicode key pressing time detection means 31 detects the pressing of the multicode key 20, and being stopped when the control key pressing time detection means 32 detects the pressing of the control key 21, or by performing these operations in the reverse sequence, thereby determining the time interval t between these two key pressing times.

In the present invention, in the case in which the control key 21 is pressed first, following by the pressing of the multicode key 20 within a prescribed period of time thereafter, it is possible to consider this operation to be outside of the range of expected operation, and also possible to use the absolute value of the key pressing time difference t.

In the present invention, the main object is to achieve recovery from the case in which the multicode key 20 is mistakenly pressed before pressing the control key 21.

The threshold value setting means 40 of the present invention includes a threshold value X which is appropriately set, a comparison being made by the comparison means 50 between this threshold value X and the difference value t, and in only the case in which the difference value t is smaller than the value of X, even in control key 21 is pressed after the multicode key 20, an error does not immediately occur, judgment being made that the control key 21 has been pressed before the multicode key 20, the result being that the special key code "&" of the multicode key 20 is output from the key code generation means 60.

It is desirable that the threshold value X of the threshold value setting means 40 have an adjustment means that enables the appropriate setting thereof, in accordance with the characteristics and ability of the operator.

The difference between a keyboard control apparatus according to the present invention and the method of the past is described below, with reference being made to FIG. 3.

FIG. 3 is a timing diagram which illustrates the timing of output of the key code in relation to the timing of pressing the multicode key 20 and control key 21, with regard to the present invention.

This timing diagram illustrates the example in which, as described above, the multicode key 20 causes the output of "6" when pressed normally as a data key, the same as in the above-noted embodiment, but causes output of the code for the special symbol "&" when the multicode key 20 and control key 21 are pressed simultaneously.

FIG. 3(A) in particular, shows the timing diagram for the case in which the shift key, which is usually preferably used as the control key 21 to be pressed first, is pressed, after which the multicode key 20 to be pressed thereafter is pressed. By pressing the control key 21 and then the multicode key 20 in this manner, the key code for "&" is output from the keyboard. This timing of key code output is the method of key code control used in the past, and this type of input is naturally used with the keyboard according to the present invention.

FIG. 3(B) is a timing diagram for the case that is the opposite of that shown in FIG. 3(A), in which the multicode key 20 is pressed first, followed by the pressing of the control key 21, which should actually have been pressed first. The delay t in the pressing of the control key 21 is compared with the simultaneous pressing recovery time X, which is a priorly set threshold value and, if $t \leq X$, the effect of pressing the control key remains valid because of the recovery action, so that the key code for the symbol "&" is output, even though the control key 21 was pressed late. In this case, the method of input is that of the present invention, as described also above.

FIG. 3(C) shows the case in which, in contrast to that shown in FIG. 3(B), $t > X$, in which case the recovery of the pressing of the shift key does not operate, so that the key code for the normal character "6" is output, this being the same as in the input method of the past.

In this manner, the output key code in the cases shown by the timing diagrams of FIG. 3(A) and FIG. 3(C) is the same as in the past. However, in the case shown in FIG. 3(B), in which the control key 21 (shift key) is pressed with a delay, but in which the delay time t is within the simultaneous pressing recovery time X, this control key affects the multicode key 20 (data key) that was pressed earlier, recovering been made so as to treat this as though the control key 21 had been pressed before the multicode key 20, thereby performing the desired control. That is, the "6" is shifted, resulting in the output of the code for "&".

Next, the operation and operating procedure of a keyboard control apparatus according to the present invention will be described, with reference being made to FIG. 2.

Specifically, if the control key 21 is pressed first, the key pressing signal therefrom is input to the control key pressing time detection means 32 of the key pressing time delay detection means 30, and when the multicode key 20 is pressed, its signal is input to the multicode key pressing time detection means 31.

Figure 2:
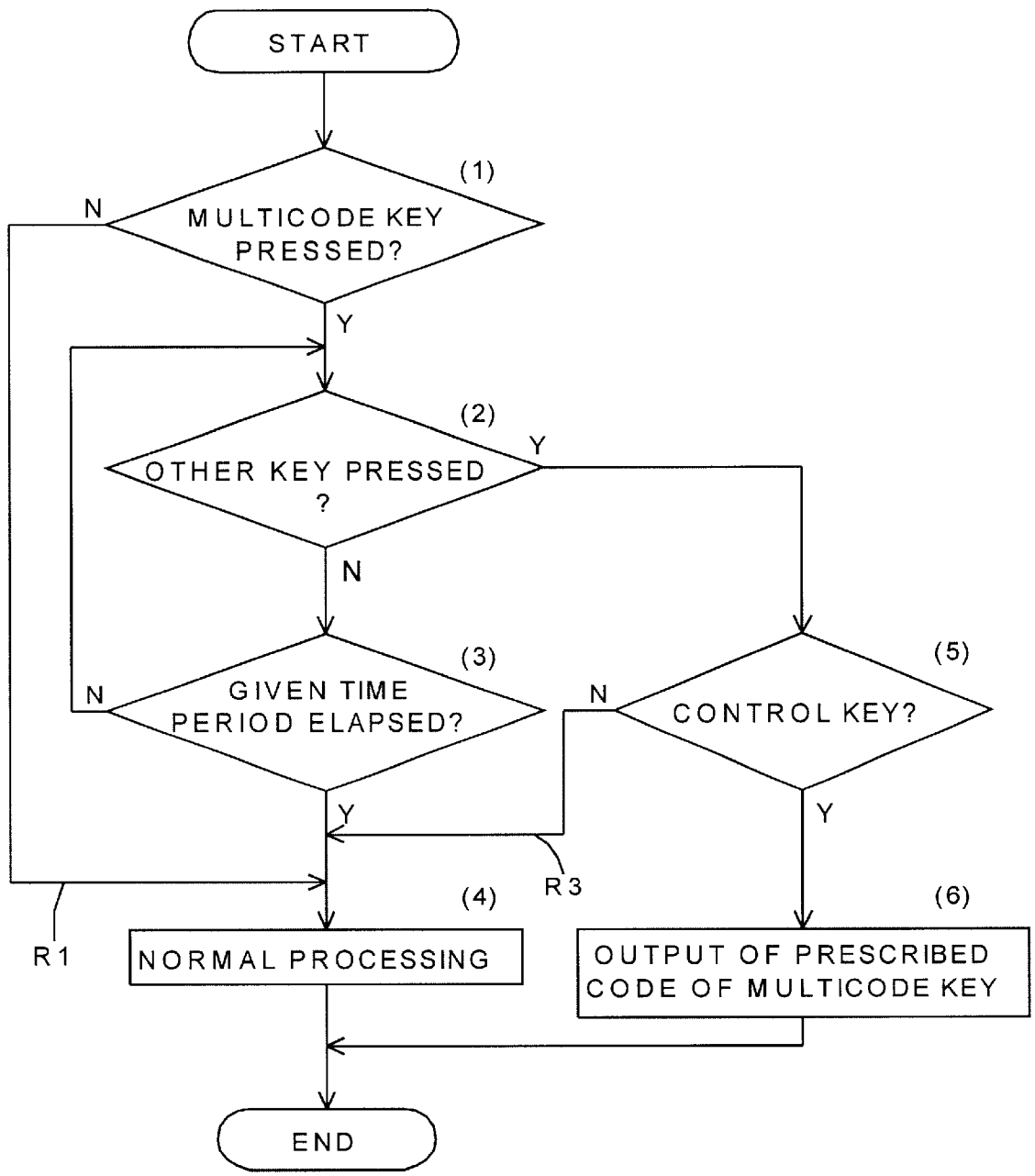
FIG. 2 is a flowchart which shows the processing flow in a keyboard control method according to the present invention.

Then the control means 80 operates so as to perform the operations shown in the flowchart of FIG. 2.

Specifically, first at step (1) a judgment is made as to whether or not the multicode key 20 has been pressed and, if the result is NO, the flow proceeds to step (4), where normal processing occurs, that is, in which case the key code for "6" is output from the multicode key 20. If, however, the result at step (1) is YES, flow proceeds to step (2), at which a judgment is made as to whether or not there was a pressing of another key.

At step (2), if the result is NO, flow proceeds to step (3), at which a judgment is made as to whether a pre-established amount of time, that is, the threshold value X of allowed delay time, has elapsed. If the result of this judgment is NO, return is made to step (2), from which the above operations are repeated.

If, however, the result at step (3) is YES, flow proceeds to step (5), at which a judgment is made as to whether or not the newly pressed key was the control key 21. If the result of this judgment is NO, flow proceeds to step (4), at which normal processing is performed. However, if the result at step (5) is YES, the flow proceeds to step (6), at which processing is executed that is the same as would be executed if the control key 21 were to be pressed before pressing the multicode key 21.

If the result at step (3) is YES, flow proceeds to step (4), at which normal processing is performed.

As described in detail above, by virtue of the ability to set a time for delay recovery externally, the pressing of the control key can be maintained valid even when it is pressed later than the data key, as long as the delay is within the above-noted delay time setting, so that a slight delay in pressing the control key during high-speed input does not result in erroneous input and enables the desired key input to be achieved.

What is claimed is:

1. A keyboard control method for a keyboard that is provided with a single multicode key to which a plurality of character or symbol codes are assigned, and a control key for selecting a prescribed code from said plurality of character or symbol codes said method comprising the steps of:

pressing and control key; and pressing said multicode key, thereby selecting the prescribed code from said plurality of character or symbol codes;

wherein, even if said pressing of said control key occurs after said pressing said multicode key, said selected code is output.

2. A keyboard control method according to claim 1, further comprising comparing a difference between a time of said pressing said control key and a time of said pressing said multicode key with a pre-established threshold value and, if said difference is smaller than said threshold value, validating the selecting of the code.

3. A keyboard control method according to claim 2, further comprising:

starting a timer upon the said pressing said multicode key;

measuring a delay time from the pressing of said multicode key to the pressing said control key; and comparing said delay time with said threshold value and, if said time delay is smaller than said threshold value, validating the selecting of the code.

4. A keyboard control method according to claim 2, wherein said threshold value can be varied to be any arbitrary value.

5. A keyboard control apparatus for a keyboard which includes a single multicode key to which a plurality of character or symbol codes are assigned, and a control key for selecting a prescribed code from said plurality of character or symbol codes, said keyboard control apparatus comprising:

a key pressing time delay detection means for detecting an actual delay time between pressing of said control key and pressing of said multicode key;

a threshold value setting means which stores a threshold value with regard to a prescribed delay time;

a comparison means for comparing said threshold value with said actual delay between said pressing of said control key and said pressing time of said multicode key; and a key code generation means which generates said selected code, in response to an output of said comparison means if said actual delay time is smaller than said threshold value.

6. A keyboard control apparatus according to claim 5, further comprising:

means for detecting a time of pressing of said multicode key;

means for detecting a time of pressing of said control key;

means for calculating a difference value between said time of pressing said multicode key and said time of pressing said control key;

means for recovering a threshold value with respect to a prescribed delay in pressing said control key;

means for comparing said difference value with said threshold value; and means for generating the selected code when said difference value is smaller than said threshold value, even if the time of pressing the control key was delayed with respect to the time of pressing the multicode key.

7. A keyboard control apparatus according to claim 6, further comprising a timer means that is started and stopped in response to said pressing said multicode key and said pressing said control key for measuring a time interval there between.

8. A keyboard control method for a keyboard that is provided with a single multicode key to which a plurality of character or symbol codes are assigned, and a control key for selecting a code from said plurality of character or symbol codes, comprising:

pressing said control key; and pressing said multicode key, thereby selecting the code from said plurality of character or symbol codes whereby, even if the pressing of the control key is delayed with respect to the pressing of said multicode key, said method comprising the steps of:

determining whether said multicode key has been pressed;

and, if said multicode key has not been pressed, performing normal key code generation processing but, if a multicode key has been pressed, determining whether another key has been pressed thereafter, and, if said another key has not been pressed and a prescribed time period has elapsed, performing normal key code generation processing for said multicode key;

but, if another key is pressed before the elapse of said prescribed time period, determining whether said another key is a control key; and if said another key was a control key, generating and outputting the selected code of said multicode key.

9. A recording medium onto which has been recorded a program which performs keyboard control for a keyboard that is provided with a single multicode key, to which a plurality of character or symbol codes are assigned, and a control key for selecting a prescribed code from said plurality of character or symbol codes, the keyboard being operated, by:

pressing said control key; and pressing multicode key, thereby selecting the code from said plurality of character or symbol codes, wherein, even if the time of the pressing of the control key is delayed with respect to the time of the pressing of said multicode key control, said prescribed code of said multicode key is selected, by a method comprising the steps of:

determining whether said multicode key has been pressed;

and, if said multicode key has not been pressed, performing normal key code generation processing but, if a multicode key has been pressed, determining whether another key has been pressed thereafter;

and, if said another key has not been pressed and a prescribed time period has elapsed, performing normal key code generation processing for said multicode key;

but, if another key is pressed before the elapse of said prescribed time period, determining whether said another key is a control key; and if said another key was a control key, generating and outputting the selected code of said multicode key.

* * * * *